United States Patent
Rasmussen et al.

(10) Patent No.: US 8,831,508 B2
(45) Date of Patent: Sep. 9, 2014

(54) SHORT RANGE, UNI-DIRECTIONAL WIRELESS LINK

(75) Inventors: Crilles Bak Rasmussen, Smørum (DK); Martin Bergmann, Smørum (DK); Peter Søren Kirk Hansen, Smørum (DK)

(73) Assignee: Oticon A/S, Smorum (DK)

( * ) Notice: Subject to any disclaimer, the term of this patent is extended or adjusted under 35 U.S.C. 154(b) by 779 days.

(21) Appl. No.: 12/991,183

(22) PCT Filed: May 6, 2009

(86) PCT No.: PCT/EP2009/055475
§ 371 (c)(1),
(2), (4) Date: Nov. 5, 2010

(87) PCT Pub. No.: WO2009/135872
PCT Pub. Date: Nov. 12, 2009

(65) Prior Publication Data
US 2011/0059696 A1 Mar. 10, 2011

(30) Foreign Application Priority Data
May 7, 2008 (EP) .................................... 08103848

(51) Int. Cl.
*H04B 5/00* (2006.01)
(52) U.S. Cl.
USPC .......... 455/41.1; 455/41.2; 455/425; 370/506
(58) Field of Classification Search
CPC .................................................. H04R 2225/55
USPC ....................................... 455/41.1, 41.2, 425
See application file for complete search history.

(56) References Cited

U.S. PATENT DOCUMENTS

| 6,424,820 B1 | 7/2002 | Burdick et al. |
| 6,754,546 B1 * | 6/2004 | Hindus et al. .................. 700/94 |

(Continued)

FOREIGN PATENT DOCUMENTS

| WO | WO 97/15125 A1 | 4/1997 |
| WO | WO 99/38272 A2 | 7/1999 |

(Continued)

*Primary Examiner* — Hsin-Chun Liao
(74) *Attorney, Agent, or Firm* — Birch, Stewart, Kolasch & Birch, LLP

(57) ABSTRACT

The invention relates to a system comprising a master device and at least one slave device, e.g. two slave devices, the master device comprising a transmitter including a Tx-inductive coil, and the slave device comprising a receiver including an Rx-inductive coil. The invention further relates to a method and use. The object of the present invention is to solve one or more problems of the prior art, e.g. economize on power consumption for a wireless communications link. The problem is solved in that the master and slave devices are adapted to establish a uni-directional wireless link for forwarding an upstream signal from the master to the slave device via the inductive coupling between the Tx- and Rx-induction coils when the master and slave devices are located within a certain distance from each other, wherein the master device is adapted to provide that the upstream signal comprises a payload signal and at least one control signal, the at least one control signal is/are embedded in the payload signal and repeated according to a predefined scheme, and wherein the at least one control signal represents an intended current setting of an operational parameter of the slave device. An advantage of the invention is that it provides a scheme for wirelessly controlling and changing the settings of a slave device from a master device using a uni-directional link from master to slave device. The invention may e.g. be used for applications involving wireless communication between devices at least one of which is a low-power (e.g. battery driven) device, e.g. a portable device, e.g. a listening device, such as a hearing instrument or a pair of hearing instruments.

26 Claims, 7 Drawing Sheets

(56) References Cited

U.S. PATENT DOCUMENTS

| | | |
|---|---|---|
| 2004/0128386 A1* | 7/2004 | Oomoto et al. ............... 709/226 |
| 2005/0255843 A1 | 11/2005 | Hilpisch et al. |
| 2007/0071264 A1 | 3/2007 | Baechler et al. |
| 2007/0269065 A1 | 11/2007 | Kilsgaard |
| 2007/0287418 A1* | 12/2007 | Reddy ............................ 455/410 |
| 2008/0069152 A1* | 3/2008 | Hann et al. .................... 370/506 |

FOREIGN PATENT DOCUMENTS

| WO | WO 2006/133158 A1 | 12/2006 |
|---|---|---|
| WO | WO 2007/046748 A1 | 4/2007 |
| WO | WO 2007/052189 A2 | 5/2007 |

* cited by examiner

SHORT RANGE, UNI-DIRECTIONAL WIRELESS LINK

TECHNICAL FIELD

The invention deals with short range, uni-directional wireless communication. The invention relates specifically to a system comprising a master device and a slave device, the master device comprising a transmitter including a Tx-inductive coil, the slave device comprising a receiver including an Rx-inductive coil.

The invention furthermore relates to a method of establishing a uni-directional wireless link for forwarding an upstream signal and at least one control signal from a master to a slave device.

The invention furthermore relates to use of a system according to the invention.

The invention further relates to a data processing system and to a computer readable medium.

The invention may e.g. be useful in applications involving wireless communication between devices at least one of which is a low-power (e.g. battery driven) device, e.g. a portable device, e.g. a listening device, such as a hearing instrument.

BACKGROUND ART

In applications involving wireless transmission of data between first and second electronic devices, one or more of the following issues can be important:

- There is limited available bandwidth and the need for upstream data streaming from the first to the second device prevents the use of bandwidth for down stream data.
- The second devices have transmitters, which are low powered in comparison with the first devices, providing asymmetrical transmission range. Thus the transmission range from the first to the second devices is longer than the range from the second to the first devices.
- Power is an issue on the second device, requiring the transmitter of that device to be kept off whenever possible.
- The first device is a transmit-only device, which cannot receive.
- The second device is a receive-only device, which cannot transmit.

Such properties are e.g. important for wireless applications targeted towards listening devices, such as hearing aids, as they are physically very limited in size. The size causes a range of problems when applying wireless technologies to e.g. hearing aids, where the most significant are:

- Limited power budget, for both transmission and reception
- Relatively small antennas (low Rx-sensitivity and Tx-efficiency)

WO 2007/046748 discloses a system for assisting a hearing impaired user, the system comprising a transmitter and receiver adapted to convey data representing audio to a user. The audio data may originate from a microphone, a speaker, a TV, a telephone, etc. The transmitter device may be configured to transmit control signals while continuing to transmit audio data (e.g. using another radio channel or by time multiplexing with the audio data).

WO 2007/052189 discloses a hearing aid system aiming at allowing a user himself to adapt the gain characteristics, etc. of a hearing aid device to his personal needs. In a specific control mode, the hearing aid device is configured to, during a control signal detection period, be programmed by control signals embedded in audio signals.

US 2005/0255843 A1 describes a wireless communication protocol, e.g. for an inductive link.

U.S. Pat. No. 6,424,820 B1 describes a short range inductively coupled wireless communication system employing analogue FM for transmitting stereo audio from a control unit to a pair of ear pieces.

DISCLOSURE OF INVENTION

The invention relates to a one-directional (in the following termed 'uni-directional') wireless link from a master (M) device to one or several slave (S) devices. The respective 'devices' are in the following occasionally termed 'nodes' when used in connection with network issues. Each set of (matching) master node and slave node(s) form a wireless network called a "Body Area Network" (BAN).

The problems of the prior art translate to a range of issues:

- Due to a limited power budget, the slave device(s) (e.g. hearing instrument(s)) cannot be allowed to transmit continuously.
- Due to the small antenna size, a comparatively high power is required to obtain a stable back-link (from slave to master device). Even if higher power consumption could be allowed, achieving a symmetrical range would still be difficult.
- When employing a half-duplex link, the bandwidth used for a back-link reduces the possible uplink data rate (from master to slave device).

An object of the present invention is to solve one or more problems of the prior art.

Objects of the invention are achieved by the invention described in the accompanying claims and as described in the following.

An object of the invention is achieved by a system comprising a master device and at least one slave device, the master device comprising a transmitter including a Tx-inductive coil, and the at least one slave device comprising a receiver including an Rx-inductive coil. Advantageously, the master and slave devices are adapted to establish a uni-directional wireless link for forwarding an upstream signal from the master to the slave device via the inductive coupling between the Tx- and Rx-induction coils when the master and slave devices are located within a certain distance from each other, wherein the master device is adapted to provide that the upstream signal comprises a payload signal and at least one control signal, the at least one control signal is/are embedded in the payload signal and repeated according to a predefined scheme, and wherein the at least one control signal represents an intended current setting of an operational parameter of the slave device.

An advantage of the invention is that it provides a scheme for wirelessly controlling and changing the settings of a slave device from a master device using a uni-directional link from master to slave device. A further advantage is that the power consumption in the slave device for communications purposes can be minimized. A further advantage is that the control of the slave device can be performed, while maintaining an uninterrupted stream of data, e.g. audio data.

Embodiments of the invention provide one or more of the following features:

- Continuous synchronization between slave node(s) within a range of the master node without requiring the slave node(s) to transmit.
- Secure transfer of data from master node to slave node(s) to maintain privacy.
- Allows for multiple BANs within a limited physical space.

These features are designed to support a fully operational system for which the need for a back-link is eliminated.

The term 'a payload signal' is in the present context taken to mean a signal containing information of a specific kind or utility (a 'desired signal'), e.g. 'audio' or 'video' (the term is used to separate its contents from control signals and the like). In a particular embodiment, a payload signal is a continuous signal. In a particular embodiment, a payload signal is a realtime signal, such as an audio signal that is continuously produced by a source.

The term 'embedded in' is in the present context intended to have its ordinary meaning, e.g. 'included in' or 'mixed with' or 'surrounded by' or 'enclosed in' or 'appended to' or 'attached to'.

A control signal for the setting of an operational parameter is preferably transmitted as a parameter representative of an absolute value (as opposed to a relative value in the form of an incremental change compared to a previous value) and the master and slave devices are correspondingly adapted. Thereby the system becomes more robust to transmission errors or non-availability of the link, and there is no need for keeping track of previous values, making the system simpler.

In a particular embodiment, the system is adapted to provide that the at least one control signal is/are assembled in a status packet of the transmitted signal. In an embodiment, the reception of the status packet in the receiver initiates an update of the setting of the operational parameter(s) of the slave device with the value(s) contained in the received status packet.

The repeated (e.g. periodic) transmission of absolute (control) parameter values enables the slave device to synchronize to the master devices at once, whenever a status packet is received and interpreted in the slave device. This provides a significant redundancy to the system, because the current control signals contained in the current status packet can be directly correlated to the current values of the state variables of the remote (slave) device, without knowledge of the prior values of the state variables.

The independence of the transmitted (current) values of the prior values of the control signals is particularly advantageous for systems depending on unidirectional links, where no acknowledgement of receipt (back to the master device) is available from the slave device, and thus no information on whether the control signals have been received and interpreted correctly by the slave device is available in the master device.

In a particular embodiment, the slave device forms part of a body-worn electronic device. In a particular embodiment, the slave device is a battery driven device, such as a listening device, e.g. a hearing instrument. In the present context 'battery driven' is intended to include any type of local source of energy adapted to provide power to movable, handheld or body worn electronic devices, such local source of energy including rechargeable or non-rechargeable batteries, fuel cells, etc.

The term 'a system' (e.g. a listening system) includes an audio system comprising a number of devices (such as two or more, typically two or three devices, at least one of which is adapted for being worn in full or partially in or at a left and/or right ear of a wearer). The term a listening device comprises a hearing instrument, a headset, a head phone, an ear-plug, etc. The term a 'listening system' may include a pair of hearing instruments of a binaural fitting or a pair of head phones or a pair of active ear-plugs and combinations thereof (e.g. headphones or headsets or ear-plugs that also have a hearing instrument function or one head phone and one hearing instrument, etc.).

The term a 'hearing instrument' is in the present context taken to mean a hearing aid comprising a signal processor whose gain profile (gain vs. frequency) can be (or has been) adapted to a specific wearer's needs to compensate for a hearing loss and/or to protect a wearer against outside excessive sound levels.

In a particular embodiment, the master device comprises an audio selection device for selecting an audio signal among a multitude of audio signals and forwarding the selected signal to the slave device. In a particular embodiment, the master device comprises a remote control device for setting particular parameters of the slave device.

In a particular embodiment, the system comprises one master device and two or more slave devices. In a particular embodiment the system is specifically adapted to two slave devices. In a particular embodiment, the two slave devices are essentially identical in function. In a particular embodiment, operational parameters of the two slave devices have a preferred relationship (are synchronized, e.g. in that one or more operational parameters are preferably essentially equal). In a particular embodiment, the master device is an audio device for streaming a signal comprising audio to one or more (slave) devices. In a particular embodiment, the two slave devices are two listening devices, e.g. one for each ear of a user, such as a pair of hearing instruments of a binaural fitting. In an embodiment, the two slave devices are not able to communicate with each other, at least during streaming of audio from the master device. In this situation, the only way of synchronizing the two slave devices is via the master device.

The use of inductive communication between the master and slave devices ensures a relatively limited range of communication (at the available power levels) thereby effectively providing localized BANs and enabling a relatively large spatial 'density' of BANs using the same frequency spectrum. The magnetic field coupling between two adjacent Tx- and Rx-inductive coils falls off as $r^3$, where r is the distance between the coils. The transmission range can thus be controlled by controlling the Tx-power emitted by the master device. Corresponding values of settable Tx-power and transmission ranges having a predefined acceptable transmission quality (e.g. as indicated by a predefined average bit error rate), e.g. with predefined orientations of the Tx- and Rx-coils relative to each other, can advantageously be initially determined. In a particular embodiment, the system is adapted to function within a predefined transmission range. In an embodiment the orientation of the Tx-coil or coils of the master device and the orientation of the Rx-coil or coils of the master device relative to each other is optimized to provide maximum transmission range, when the master and slave devices are used in their normal operative environment and position (the master device e.g. being worn in a loop around the neck or carried in a pocket or fixed to a belt, etc. of a person, and the slave device e.g. being worn at or in an ear of the same person).

In a particular embodiment, the system is adapted to optimize the wireless link to function properly when the distance between the locations of the master and slave devices is smaller than a certain maximum BAN-distance, e.g. smaller than 2 m, such as smaller than 1.5 m, such as smaller than 1 m, such as smaller than 0.6 m, such as smaller than 0.5 m. In a particular embodiment, the system is adapted to optimize the wireless link to function properly when the distance between the locations of the master and slave devices is in the range from 0.1 m to 2 m, such as 0.2 m to 1.5 m. The term 'function properly' can e.g. be based on achieving a transmission with a maximum predefined average bit error rate at a predefined transmission bit rate (e.g. determined by measurement prior to the intended use of the system).

In an embodiment, the master device comprises more than one Tx-inductive coil to improve the transmitted inductive signal. In an embodiment, the slave device comprises more than one Rx-inductive coil to improve the conditions for reception of a transmitted inductive signal from a corresponding master device. In an embodiment, the mutual orientation of the more than one Tx-coils is optimized to provide a particular form and homogeneity of the resulting magnetic field (and thus the BAN). In an embodiment, the mutual orientation of the more than one Rx-coils is optimized to the particular form and homogeneity of the resulting magnetic field from the corresponding master device, when the slave device is located at its normal operative position in the BAN relative to the master device.

In an embodiment, the inductive coupling between the master device and the slave device is optimized to a predefined frequency range, e.g. by adapting the number of turns, the values of a capacitor and/or a resistor of a resonance circuit formed by the coil, the capacitor and/or the resistor to provide a specific preferred frequency range for the inductive communication. Such optimization is preferably performed for each of the coil circuits of the involved master and slave devices. The communication between the master device and the slave device may in principle be in any frequency range, e.g. in the RF-range. In an embodiment, the preferred range is in the MHz-range (e.g. in the range between 1 MHz and 30 MHz or between 10 MHz and 100 MHz).

If interference between several master devices possibly issuing 'conflicting' signals and one or more slave devices is not possible (or is acceptable), no particular matching of a master device to one or more particular slave devices is necessary. A master device is, however, typically adapted for being matched (paired) with at least one specific slave device (which, on the other hand, is adapted to be matched with the master device in question). The matching can be governed by any appropriate means.

In a particular embodiment, the linking procedure between master and slave is based on the identification of a predefined security key in the slave device corresponding to a predefined security key of the master device, e.g. in the form of a number of encrypted or non-encrypted bits. The complexity of the security key (including its length) can advantageously be adapted to the level of security of the application in question. A master and a slave device are said to be paired or matched, for example if they have been provided with corresponding security keys.

In a particular embodiment, the master device is adapted to provide that the transmitted payload signal comprises packets of data, e.g. audio data (i.e. data representing an audio signal, e.g. music). In an embodiment, the signal transmitted from a master device to a slave device in addition to a control signal representing an intended current setting of an operational parameter of the slave device comprises a link security key for allowing a particular slave device to receive the payload of a transmitted signal from the master device in question.

In a particular embodiment, the system is adapted to provide that the transmitted payload signal comprises packets of data and packets of status signals.

In a particular embodiment, the system is adapted to provide that the control signal(s) form(s) part of the packets of status signals. In a particular embodiment, the system is adapted to provide that the security key forms part of the packets of status signals.

In a particular embodiment, the system is adapted to provide that the reception of the status packet initiates an update of the setting of the operational parameter(s) of the slave device with the value(s) contained in the received status packet or based thereon.

In an embodiment, a status packet is attached to every payload data packet, or to every second data packet or to every $5^{th}$ or $10^{th}$ data packet. In an embodiment, a status packet is attached to every $N^{th}$ data packet, where N is larger than 3, such as larger than 7, such as larger than 20, such as larger than 50. In an embodiment, the frequency of occurrence of the status packet is determined (e.g. dynamically) according to the available bandwidth. The 'available bandwidth' is the residual bandwidth considering the link bandwidth at hand (determined by the transmission rate) and the bandwidth occupied by the 'payload signal' (e.g. a realtime audio signal). The payload-bandwidth is typically determined by a chosen transmission standard.

In an embodiment, the frequency of occurrence of status packets is relatively higher during relatively high bandwidth utilization of the payload signal, while the frequency of occurrence of status packets is relatively lower during relatively low bandwidth utilization of the payload signal. In another embodiment, the frequency of occurrence of status packets is relatively lower during relatively high bandwidth utilization of the payload signal, while the frequency of occurrence of status packets is relatively higher during relatively low bandwidth utilization of the payload signal. Fore example, in applications with only low bandwidth utilization, for instance during streaming of audio in low quality from e.g. telephones, the status packets can be transmitted more frequently, to utilize the excess bandwidth. The higher frequency of occurrence of status packets enables the slave device(s) (e.g. hearing instrument(s)) to be synchronized faster. When a higher bandwidth is required, e.g. during transmission of audio at a higher quality, the frequency of the status packets can be decreased in order to provide more bandwidth for the audio transmission.

In an embodiment, a predefined scheme for embedding a control signal (CTRL) in the payload signal (e.g. audio) comprises that status signal bits are inserted with a predetermined normal repetition frequency $f_{rep1}=1/t_{r1}$, where $t_{r1}$ is the normal time between the appearance of CTRL-bits and the normal number of CTRL bits is CT1, when the requested number of payload bits is below a threshold value $AF_{th}$. In case the requested number of payload bits is above the threshold value $AF_{th}$, the number of CTRL bits per packet is reduced to CT2. In case the requested number of audio bits does not allow space for even the reduced number of CTRL bits CT2 at the normal time of occurrence of the CTRL bits, insertion is delayed up to a predefined maximum $t_{rd}$ to check whether sufficient CTRL-bits (CT1 or CT2) are available in one of the next coming packets ($\le t_{rd}/T_p$ packets, where $T_p$ is the length of a packet). If this is NOT the case, the lower number CT2 of CTRL bits are forcibly inserted, and the time between the appearance of CTRL-bits possibly increased to $t_{r2}$, until the requested payload bandwidth again allows the normal number of CTRL bits CT1 to be inserted and the normal repetition frequency is $1/t_{r1}$ is re-established.

In an embodiment, the timing parameters $t_{r1}$, $t_{r2}$, and/or $t_{rd}$ are chosen according to the scheme for re-establishing a normal connection between master and slave devices after errors or breakdown of the uni-directional link. In an embodiment, relatively shorter values of the timing parameters are chosen, the faster the requirement to re-establishment of the link with correct settings of the operational parameters. The shorter the values of the timing parameters, the larger the requirement to bandwidth for control signals and the smaller the available bandwidth for the payload signal (e.g. audio).

In an embodiment, the data packets comprise audio data. In an embodiment the data packets together represent a continuous, realtime audio signal (continuous in the sense that it is continuously generated by a source, e.g. with a duration of more than 10 seconds, such as more than one minute and realtime in the sense that it is transmitted with substantially the same rate that it is generated, or in the sense that it is transmitted as data arrives from a source, in other words without larger parts (e.g. of a duration of more than 100 ms or 1 s or 10 s or more) of the transmitted payload signal being specifically stored in a storage medium other than a temporary buffer).

In an embodiment, different control signals (e.g. a security key, a volume setting, a program selection), have different frequencies of occurrence in the predefined scheme for embedding a control signal in the payload signal.

In an embodiment, a link security key for matching a master to a slave device is attached to each data packet.

In a particular embodiment, the at least one control signal and/or link security key and/or status packet is periodically repeated in the payload signal, e.g. at least every 1 s, such as at least every 1 ms, such as with a repetition time in the range from 100 ms to 500 ms, e.g. around 200 ms.

In a particular embodiment, the length of a status packet is optimized with regard to minimizing latency. In an embodiment, a status packet is broken into several packets that are distributed in the payload (e.g. evenly distributed) to minimize latency. In an embodiment, the system is adapted to provide that the latency (delay) of the audio signal received by the receiver compared to the original audio signal (e.g. as fed to the transmitter) is smaller than 30 ms, such as smaller than 20 ms, such as smaller than 15 ms, such as smaller than 10 ms.

The length of a status packet (as given in time or number of bits (at a given bit rate)), and thus the time it takes to transmit it constitutes the minimum buffer length required in the receiver in order to provide an uninterrupted real time data (audio) stream. As the length of the status packets are shortened, the buffer length required on the receiver approaches 0.

A status packet typically consists of a header and an information-content (e.g. a control signal, a security key, etc.). The shortening of the status packet can only be done effectively until a certain threshold length, where a further shortening leads to an overall higher bandwidth requirement, because more instances of the status packet header will be required to transmit the same information-content. In general, though, lower status packet length and lower status packet transmission frequency (and thus lower synchronization speed) can be traded for more bandwidth to the payload data stream. Similarly, lower latency and/or higher synchronization speed can be achieved, if accepting less bandwidth for the real time (payload) data stream. The adaptation of the frequency of occurrence and/or the length of status packets can be implemented in software.

In a particular embodiment, a control signal is used for controlling the volume setting of the listening device.

In an embodiment, the at least one control signal comprises control signals for the setting of one or more parameters of the slave device selected from the group of parameters comprising receiver volume, program selection (e.g. specifying a program optimized to a particular acoustical environment or to a particular quality of the received signal, setting the microphone on or off, etc.), sound effects (e.g. a call tone indicating a telephone call or other acoustic signals with predefined meaning), type of audio signal transmitted (e.g. telephone signal, music, stereo, etc., possibly represented by a bandwidth specifying signal).

In a particular embodiment, the system is adapted to provide that the security key is checked every time a status packet is received.

In a particular embodiment, the system is adapted to provide a data transmission rate of the uni-directional link in the range from 50 kbit/s to 1 Mbit/s, such as in the range from 100 kbit/s to 500 kbit/s.

In an embodiment, a frequency of occurrence of a particular control signal (e.g. volume) is higher for a predefined time after a user initiated change of the parameter than under normal conditions. In an embodiment, a frequency of occurrence of a particular control signal (e.g. volume) is dependent on the size of the change, a relatively larger change resulting e.g. in a relatively higher frequency of occurrence than a relatively smaller change.

In an embodiment, the scheme for effectuating a user initiated change on the master device of an operational parameter (e.g. volume) of a slave device is dependent on present requested audio bandwidth. In an embodiment, a user initiated change of an operational parameter results in an insertion of a corresponding control signal in the normal predefined scheme for embedding a control signal in the payload signal when the currently requested payload (e.g. audio) bandwidth is below a predefined threshold value $A_{th}$. In an embodiment, a user initiated change of an operational parameter results in that an immediate, asynchronous insertion of a corresponding control signal is embedded in the payload (possibly at the cost of payload data), if the currently requested payload (e.g. audio) bandwidth is above a predefined threshold value $A_{th}$.

In a particular embodiment, the slave device is adapted to monitor the reception of the payload signal (e.g. audio data) and/or the reception of control signals. In an embodiment, the slave device is adapted to monitor the bandwidth utilization of the received payload signal (e.g. audio data).

In a particular embodiment, the slave device is adapted to detect errors in or break-down of the uni-directional link by monitoring the payload signal and/or the embedded control signal.

In a particular embodiment, the slave device comprises one or more algorithms for taking a decision and/or initiating an action based on detected errors in the uni-directional link.

In a particular embodiment, the slave device is adapted to take a decision and/or initiate an action when a predefined number of consecutive payload packets and/or a predefined total number of payload packets per unit time have been lost or are erroneous. In an embodiment, the decision of a packet being erroneous is based on a CRC check. In a particular embodiment, the decision and/or action relate to closing down the uni-directional link.

In a particular embodiment, the slave device is adapted to monitor whether the control signal occur in the received signal in accordance with the predefined scheme, e.g. using a timer to check the time between each received burst of control signal bits. In a particular embodiment, the slave device is adapted to take a decision and/or initiate an action if a predefined deviation from this scheme is detected. In a particular embodiment, the decision and/or action relate to resetting at least some of the operational parameters to a default setting. In a particular embodiment, the decision and/or action relate to closing down the uni-directional link.

Preferably, the slave device is adapted to coordinate the reactions to lost payload packets and lost control signal bits in a predefined manner. In an embodiment, a decision to reset an operational parameter related to a service provided by the payload data (e.g. the presentation of an audio signal, e.g. music, to the user) to a default value is taken before the action of closing down the uni-directional link is implemented.

In a particular embodiment, the system is adapted to provide that the algorithm for embedding and/or repeating the control signal (or control signal data) in the payload signal (or payload data) in the upstream signal of the uni-directional link from the master to the slave device AND the algorithm(s) for taking a decision and/or initiating an action in the slave device in case errors are detected in the uni-directional link are adapted to each other. In an embodiment, the adaptation of the algorithms to each other is related to the users' perception of the received payload signal, e.g. the audio signal. In an embodiment, the adaptation is related to the timing and/or level of parameters (e.g. of differences in parameters between two slave devices), e.g. how long time is a different setting (e.g. volume) of a parameter at a given level of two slave devices inaudible or acceptable to a user. In an embodiment, such acceptable levels are adapted to a particular users' hearing profile.

A Method:

It is intended that the features of the system described above, in the detailed description describing modes for carrying out the invention and in the claims can be combined with the method as described below. The method and its embodiments have the same advantages as the corresponding system described above.

In an aspect, a method of establishing an uni-directional wireless link for forwarding an upstream signal from a master to a slave device is furthermore provided by the present invention. The method comprises a) providing a master device comprising a transmitter including a Tx-inductive coil;

b) providing a slave device comprising a receiver including an Rx-inductive coil;

c) providing that the master and slave devices are located within a certain distance from each other to provide an appropriate inductive coupling between the Tx- and Rx-induction coils enabling inductive communication from transmitter to receiver;

d) providing that the upstream signal comprises a payload signal and at least one control signal;

e) providing that at least one control signal is/are embedded in the payload signal and repeated according to a predefined scheme; and f) providing that the at least one control signal represents an intended current setting of an operational parameter of the slave device. This has the advantage that power consumption in the slave device for communications purposes can be minimized.

In a particular embodiment, the method comprises providing the master device with a security key and providing the at least one slave device that is/are intended to receive a transmitted signal from the master device with a corresponding predefined key.

In a particular embodiment, the method comprises establishing a linking mode wherein the security key received in the at least one slave device is compared to the predefined key of the device in question.

In a particular embodiment, the method comprises providing that the at least one control signal is/are assembled in a status packet of the transmitted signal and that the reception of the status packet initiates an update of the setting of the operational parameter(s) of the slave device with the value(s) contained in the received status packet.

In a particular embodiment, the method comprises providing that the frequency of occurrence of the status packet is determined, such as dynamically determined, according to the available bandwidth.

In a particular embodiment, the method comprises providing that the payload signal represents a continuous, realtime audio signal.

In a particular embodiment, the method comprises providing that the length and/or frequency of occurrence in the payload signal of a status packet is optimized with regard to minimizing latency.

In a particular embodiment, the method comprises providing that the frequency of occurrence of status packets is relatively higher during relatively high bandwidth utilization of the payload signal, while the frequency of occurrence of status packets is relatively lower during relatively low bandwidth utilization of the payload signal. In another embodiment, the frequency of occurrence of status packets is relatively lower during relatively high bandwidth utilization of the payload signal, while the frequency of occurrence of status packets is relatively higher during relatively low bandwidth utilization of the payload signal.

In a particular embodiment, the method comprises providing that the control signal representing an intended current setting of an operational parameter of the slave device is transmitted as a parameter representative of an absolute value.

Use:

Use of a system as described above, in the detailed description describing modes for carrying out the invention and in the claims is moreover provided by the present invention, e.g. in a listening system, e.g. a hearing aid system. In a particular embodiment, the slave device of the used system form part of a listening device, e.g. a hearing instrument. In a particular embodiment, the master device of the used system form part of a communications device, e.g. an audio selection device, adapted for establishing a wireless link to another device in the system, e.g. a hearing instrument or a pair of hearing instruments.

A Computer-Readable Medium:

A tangible computer-readable medium storing a computer program comprising program code means for causing a data processing system to perform at least some of the steps of the method described above, in the detailed description of 'mode(s) for carrying out the invention' and in the claims, when said computer program is executed on the data processing system is furthermore provided by the present invention. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

A data processing system comprising a processor and program code means for causing the processor to perform at least some of the steps of the method described above, in the detailed description of 'mode(s) for carrying out the invention' and in the claims is furthermore provided by the present invention.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
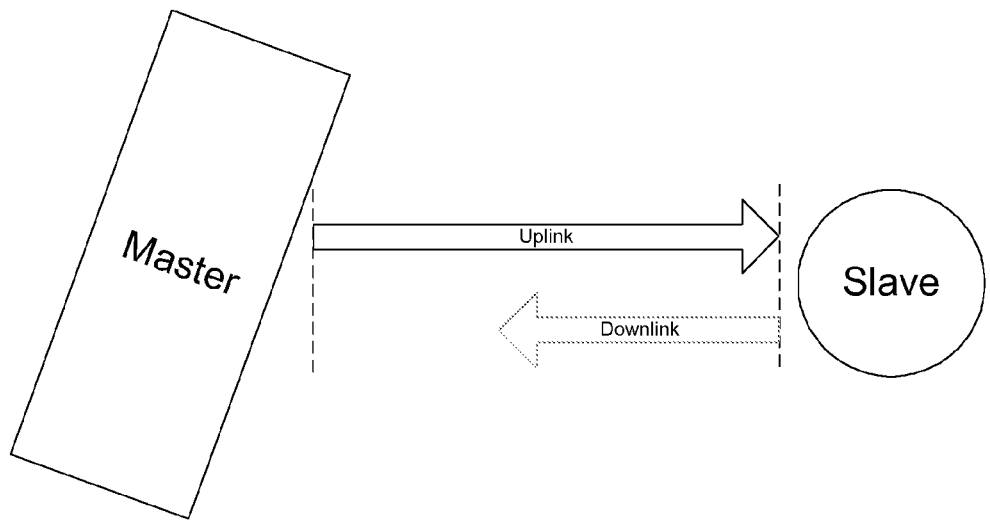
FIG. 1 shows the asynchronous range between master and slave node.

FIG. 1 shows the asynchronous range between master and slave node. In a battery driven communications device, such as a hearing instrument, where space is at a minimum, power consumption of any particular function, here wireless communication, is an important issue. The small capacity of a battery (or other energy source) of a hearing instrument results in a relatively low spatial range of transmission of a wireless link as illustrated by the relatively shorter arrow from the Slave (e.g. a hearing instrument) to the Master (e.g. an audio selection device). An example of a system comprising a hearing instrument and an audio selection device is e.g. described in EP 1 460 769 A1 and in WO 2007/046748. An example of a system comprising a hearing instrument and a remote control device with a uni-directional link based on inductive communication is e.g. described in U.S. Pat. No. 6,816,600. Inductive communication (i.e. communication based on electromagnetic induction as opposed to electromagnetic radiation) between a hearing instrument and a gateway device in accordance with a standard or proprietary protocol is e.g. described in EP 1 480 492 A2.

Wireless Transmission

The invention relies on an inductive link which provides a relatively homogenous field within a limited area. Outside this area, the field strength drops off rapidly, thus limiting the functional range to this confined area.

Figure 2:
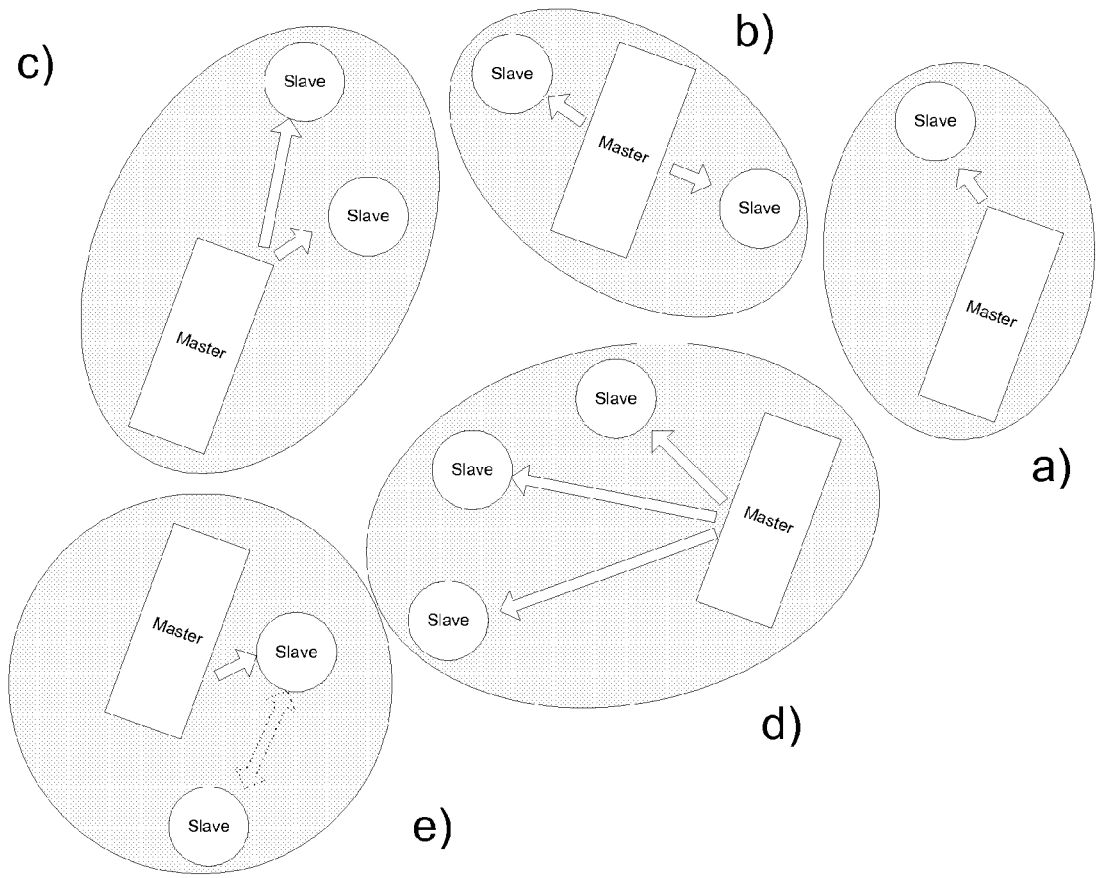
FIG. 2 shows multiple BANs allowed within a confined space due to limited range.

This allows, as illustrated in FIG. 2, for multiple BANs operating within a limited space without interfering with each other, allowing for reuse of the same frequencies throughout the area as well as effectively preventing other parties from picking up a transmission. Various combinations of master and slave devices located within the same BAN (and where it is assumed that master and slave(s) are mutually matched) are indicated in FIG. 2. Combinations include a) a master device with a uni-directional (one-way) wireless link to one slave device, b), c) a master device with uni-directional wireless links to two slave devices, d) a master device with uni-directional wireless links to three slave devices, e) a master device (e.g. a remote control) with a uni-directional wireless link to one slave device, where the one slave device has a bi-directional (two-way) wireless link to another slave device). Situation e) can e.g. describe an audio selection (master) device wirelessly communicating with a first listening (slave) device of a binaural system (e.g. a binaural hearing aid system) wherein the first listening (slave) device can communicate wirelessly with a second listening device via a bi-directional link (e.g. a short range (e.g. 20-30 cm), relatively low bandwidth communication link, e.g. based on inductively coupled coils in each listening device or based on radiated electromagnetic fields). Alternatively or additionally situation e) can describe a remote control (master device) wirelessly transmitting settings to a first listening (slave) device of a binaural system wherein the first listening e.g. forwards the settings from the remote control to the other (slave) device and/or synchronizing status signals can be exchanged between the (slave) devices of the binaural system.

In an embodiment, a data transmission rate of the uni-directional link from the master node to the slave node is in the range from 50 kbit/s to 1 Mbit/s, such as in the range from 100 kbit/s to 500 kbit/s, such as e.g. around 200 kbit/s.

Inductive Link

Security

The link security is based on two tiers. First of all a perpetrator has to be within range of the BAN in order to pick up the signal and in order to listen in a security key has to be known. Given the properties of the inductive link, this means that any perpetrator would need to be within less than 2 meters in order to be able to receive the streaming from the master device. Embodiments may be implemented with a special view to reducing the range of the inductive link to less than 1.5 m or less than 1 m (which additionally conserves energy in the master device).

To provide additional security, a security key is required in order to receive the streaming.

Linking

The linking procedure is the exchange of the security key. The key can either be exchanged manually or transmitted wirelessly from master node to slave node(s), after putting the slave node(s) into a special "linking mode". After completing the linking process, slave and master devices are able to communicate.

Key

In order for the slave node(s) to receive the signal it/they need to know the security key. A security key can comprise a smaller or larger amount of bits, depending on the degree of security needed. The security key can be randomly generated or e.g. be a unique identification code for the master device. The system is adapted to provide that the key is known by both the master and the slave node(s) and used to maintain privacy by securing the transmission. The security key can e.g. be coded into matching master and slave devices in separate product matching procedure, when the devices are sold or packaged or customized to a particular user. In case of a slave device being a hearing instrument, the pairing to a master device (e.g. an audio selection device or a remote control for the hearing instrument) can conveniently take place in connection with the user customization of the hearing instrument, where settings adapted to the needs of a particular user are fed to the hearing instrument, typically using a fitting software running on a programming unit (e.g. a PC) and transferred to the hearing instrument via a wired or wireless interface.

In order for any perpetrator to eavesdrop on the connection their slave node(s) need to have the key used by the master node. If a relevant security code is not known by a slave device receiving an upstream signal from a master device, the received signal is discarded.

Securing the Link

The link is secured by the master node adding the security key to each data packet transmitted. Whenever a slave node receives a data packet, it checks the security key to see whether the packet is sent using an allowed key. If the key is not recognized, the data packet is discarded, whereas the packet is passed on if the key is recognized.

Figure 3:
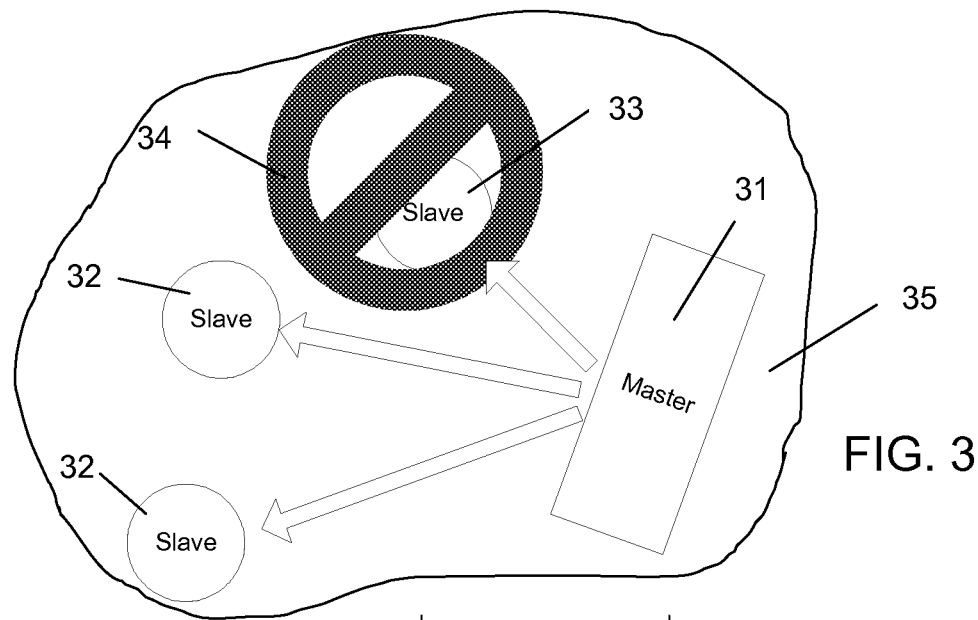
FIG. 3 shows non-linked slave device within another BAN.

In situations where no or little excess bandwidth is available, say during audio streaming, a different scheme is used. During continuous data streaming of non-critical data, the key is not added to each packet. Instead it is transmitted at longer intervals, by embedding a status packet into the data stream. Every time a status packet is received, the security key is examined and if the key is known, the stream processing is started, or allowed to continue. If the key does not match any known keys, the stream processing is stopped in the slave device in question as illustrated in FIG. 3. FIG. 3 shows non-linked slave device within another BAN, illustrating a situation where one non-matching (as indicated by Ø-symbol 34) slave device 33 (e.g. a hearing aid) is located within the range of a BAN 35 as defined by the master 31 (e.g. an audio selection device). Two matching slave devices 32 (e.g. a pair of hearing aids) are further present in the BAN.

Control

The system is designed to transfer control data from the master node to the slave node(s).

Continuous One Way Synchronization

The master node provides continuous synchronization between the attached slave nodes by periodically transmitting the state variables which are changeable. Whenever a slave node enters the BAN, it will synchronize to the state of the BAN master node upon receiving a status packet.

If a slave node is out of range, and re-enters the BAN, it will automatically resynchronize to the same state variables as the other slaves in the BAN upon receiving a status packet.

In order to provide robust synchronization between master and slave node(s), all state variables should be transferred as absolutes, rather than as relatives. This means that if for instance a state variable is changed from 5 to 7, it should be transmitted continuously as 7 rather than a single time as a 2 increment.

Figure 4:
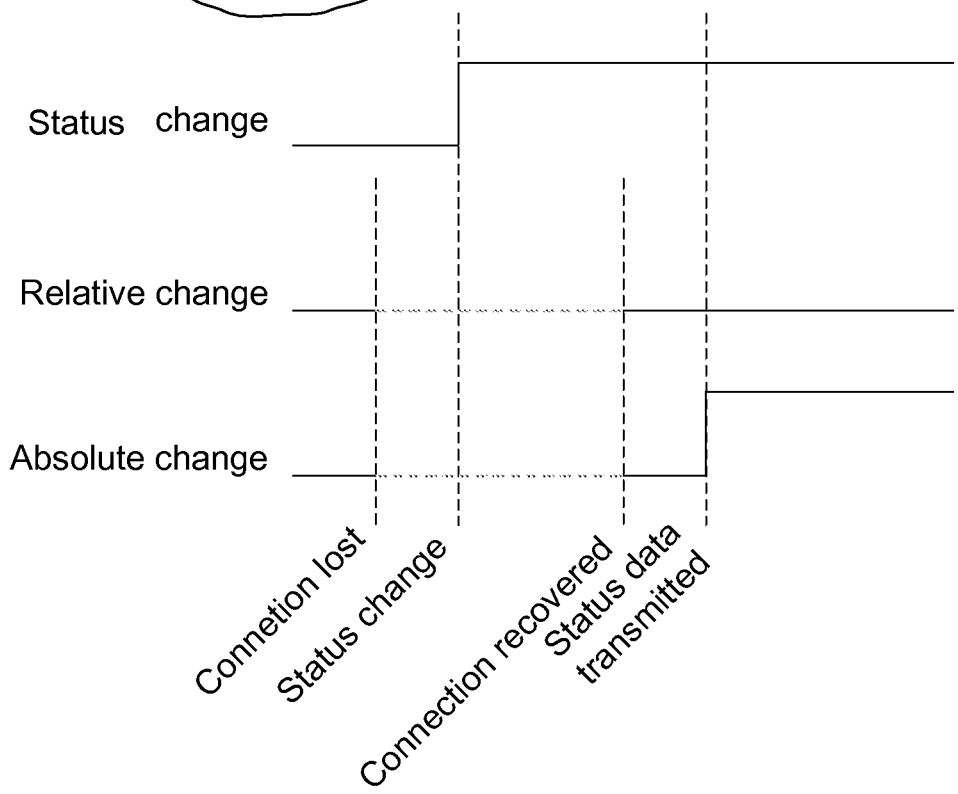
FIG. 4 illustrates the difference between absolute and relative control.

FIG. 4 illustrates the difference between absolute and relative control, where the top line shows a status change with a slave node within range. In this case operation will be the same for both relative an absolute control. The second line shows what happens if the link is temporarily down while a relative change is sent. Even though the message is sent, nothing happens, as the change is not received, and it is never retransmitted. The bottom line shows what happens in the same situation, using absolute control. In this case the state information is transmitted periodically, and as soon as the link is reconnected to the slave device, it will start receiving status data again, and resynchronise to the master device.

Embedded Data

Figure 5:
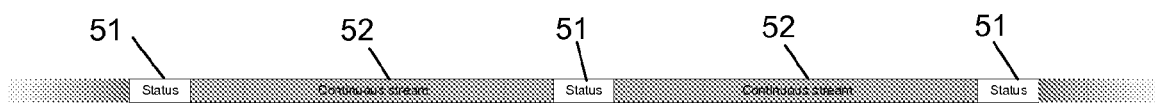
FIG. 5 shows an example of the embedding of status data.

In situations where the master node is transmitting a continuous stream of data, the synchronization data can be embedded periodically into the data stream in order to provide synchronization even though data is streamed. In an embodiment, the status packet is periodically repeated as illustrated in FIG. 5, e.g. every 200 ms. FIG. 5 shows an example of the repetitive (here periodic) embedding of status data 51 in a continuous audio stream 52 (payload) signal.

The embedding of status data causes a slight latency as stream data should be buffered in order to have a continuous stream even though it is interrupted by status information. In order to keep the latency as low as possible, the status data should be broken up into many short chunks rather than fewer larger. Preferably, the short chunks are distributed evenly in the payload signal.

Figure 6:
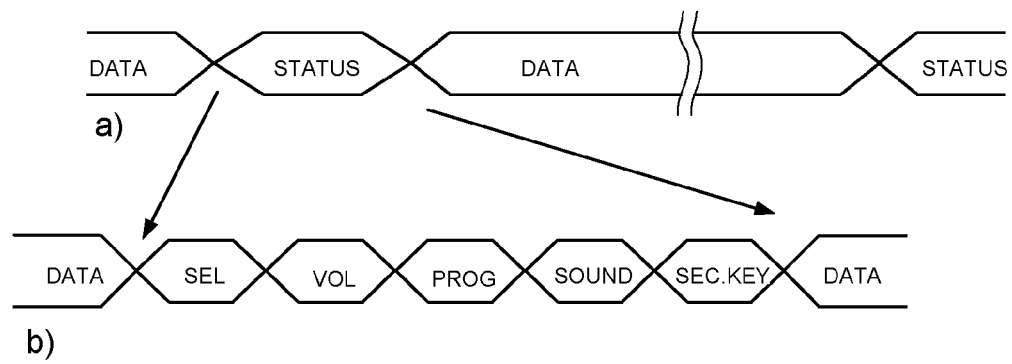
FIG. 6 shows an example of an upstream signal comprising data and status packets (a) and an example of the contents of a data packet (b)

FIG. 6*a* shows an example of an upstream signal transmitted by a master device to a slave device and comprising a payload signal and control signals. The payload signal comprises data packets (DATA) and status packets (STATUS). The status packets comprise control signals for setting operational parameters of a matching slave device. FIG. 6*b* shows in more detail an example of the contents of a status packet of FIG. 6*a*. The status packet comprises the control signals SEL, VOL, PROG and SOUND representative of the setting of corresponding parameters of the slave device. The status packet further comprises a security key (SEC. KEY) to be matched by a slave device in order for the slave device to accept the transmission. The select control signal SEL specifies the type of audio signal transmitted (e.g. telephone signal, music, stereo, etc., possibly represented by a bandwidth specifying signal). The volume control signal VOL is the intended setting of receiver volume of the slave device in a format representative of the intended level of volume in absolute terms. The program control signal PROG can e.g. initiate the selection of a program optimized to a particular acoustical environment or to a particular quality of the received signal, or initiate the setting of the microphone to on or off, etc. The sound control signal SOUND is a control signal for sound effects to be indicated to a user via a receiver of the slave device, e.g. a call tone indicating a telephone call or other acoustic signals with predefined meaning.

System

Figure 7A:
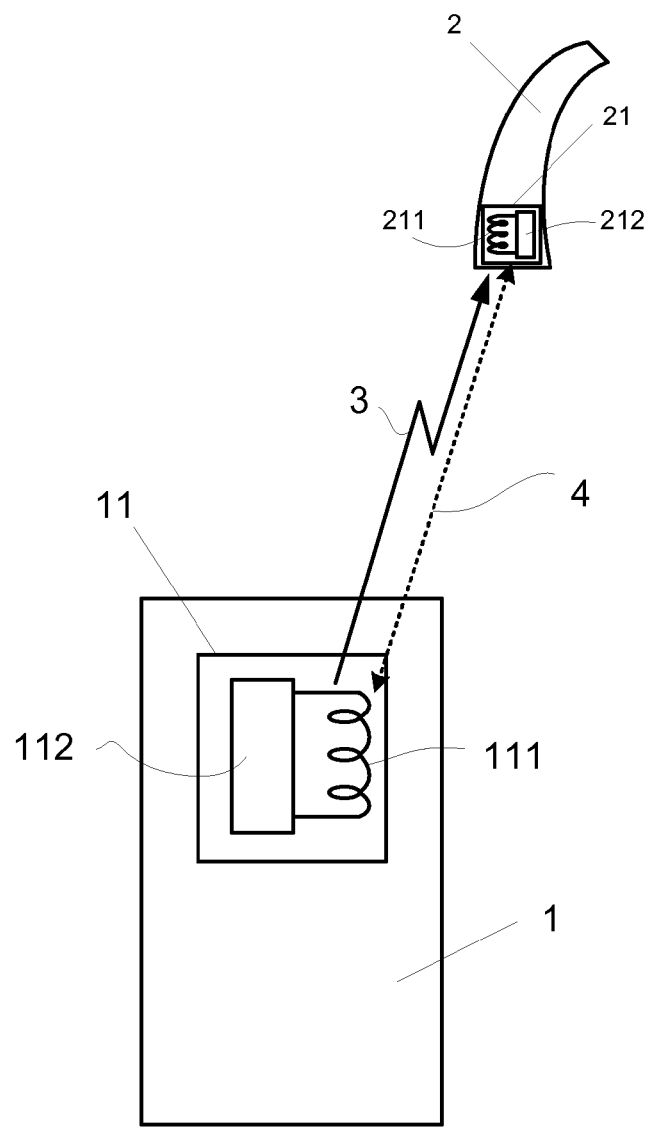
FIG. 7a shows a system according to an embodiment of the invention and FIG. 7b shows a schematic example of the composition of a transmitted upstream signal.

FIG. 7*a* shows an embodiment of a system according to the invention. The master device 1 comprises transmitter 11 comprising drive circuit 112 and Tx-inductive coil 111. The slave device 2 (here having the form of a behind the ear part of a hearing instrument) comprises a receiver 21 comprising Rx-inductive coil 211 and receive circuitry 212. The transmitter 11 and receiver 21 are adapted so that an excitation of Tx-coil 111 with an upstream signal 3 results in a magnetic coupling with Rx-coil 211, when they are located within a predefined distance of each other (indicated by dashed arrow 4, referring to the linear path distance between the Tx- and Rx-coils) and a corresponding reception of the signal in receiver 21.

Figure 7B:

The transmitter 11 is adapted to wirelessly transmit an upstream signal 3, schematically exemplified in FIG. 7b to comprise control packets embedded in a payload signal (here a realtime, continuous audio signal) and the receiver is adapted to receive said signal. The actual merging of the payload packets with the status packets may be performed in the transmitter or in another component of the master device 1 (e.g. in a processor). Similarly, the actual separation of the received signal in payload (e.g. streaming audio) and control packets, respectively, can be performed in the receiver or elsewhere in the slave device, e.g. in a processor.

Figure 8A:
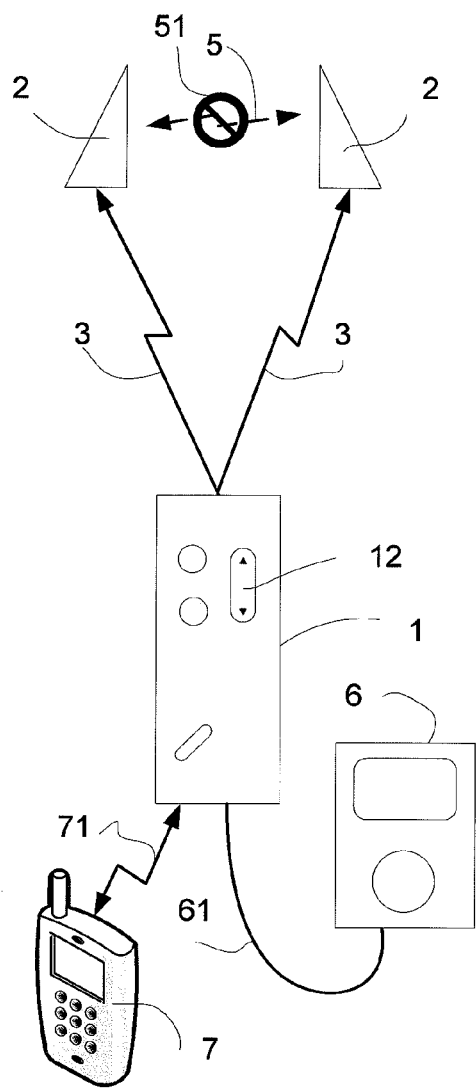
FIG. 8 illustrates a listening system according to an embodiment of the invention and comprising a (master) audio gateway device and a pair of (slave) hearing instruments of a binaural fitting in two scenarios, FIG. 8a showing a normal situation during audio streaming and FIG. 8b a situation where the wireless link to one of the hearing instruments is erroneous.
Figure 8B:
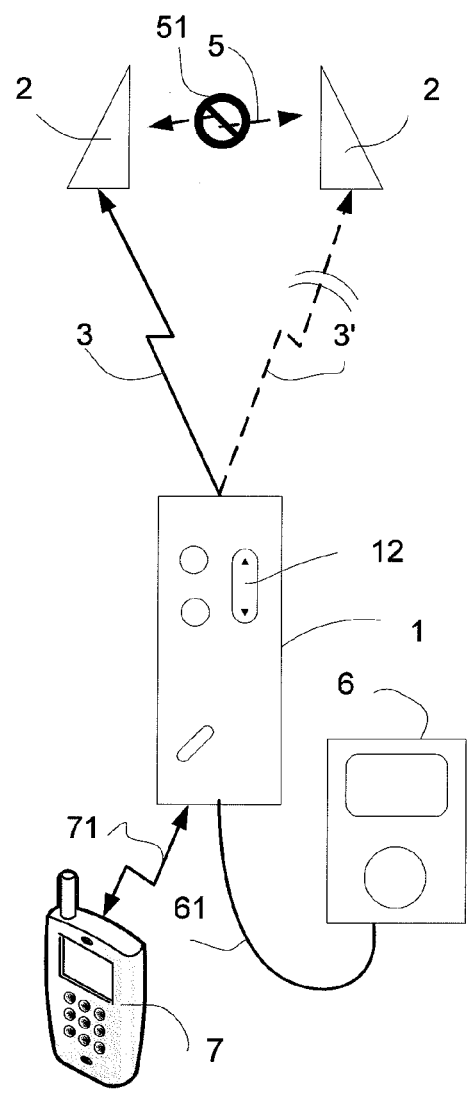

FIG. 8 illustrates a listening system according to an embodiment of the invention, the system comprising a (master) audio gateway device 1 and a pair of (slave) hearing instruments 2 of a binaural fitting in two scenarios. The audio gateway is preferably adapted to be worn on the body, e.g. fixed to clothing or in a neck-strap around the neck of a user of the hearing instruments to ensure an appropriate distance between the master 1 and slave devices 2 with regard to transmission quality. The audio gateway 1 is electrically connected to an audio delivery device 6 (e.g. a music player), here via a wired connection 61, and to a two-way communication device 7 (e.g. a mobile telephone, such as a cordless telephone or a cell phone), here via a wireless link 71. Alternatively, the audio gateway 1 may be connected to or comprise a combination of such one-way audio delivery and two-way telecommunication functionality. Each of the audio delivery 6 and communication 7 devices are capable of providing an audio input to the audio gateway 1. A one-way wireless link 3 between the audio gateway and each of the hearing instruments 2 can be established. The audio gateway is capable of transmitting a selected audio input signal (or a mixture thereof), as selected by a user, on the wireless links 3 to the hearing instruments 2. One or more operational parameters of the listening devices can be influenced by the user from the audio gateway 1 (e.g. volume, cf. regulator 12). The two hearing instruments 2 are—in certain modes—capable of establishing a wireless link 5 between them, e.g. to exchange control information to ensure intended settings of operational parameters in the two hearing instruments (synchronization) and/or to transmit an audio signal in full or part from one instrument to the other. In the modes illustrated in FIGS. 8a and 8b, though, this link 5 is disabled as indicated by the symbol 51. Such modes, where interconnection between the hearing instruments is disabled, include audio streaming mode, where an audio signal (e.g. comprising music from the audio delivery device 6 and/or audio data from the telephone 7) is transmitted to the hearing instruments 2 via the wireless links 3. The wireless links 3 are uni-directional links as described above, based on an inductive coupling between coils of the two respective devices, where a control signal representing an intended current setting of an operational parameter (e.g. volume) of the slave device (the hearing instrument 2) is embedded in the payload audio signal and repeated according to a predefined scheme (cf. e.g. FIG. 9). In a given situation, depending on the distance between the master and slave devices, the transmit power, the receiver, the modulation scheme, etc., a particular link bandwidth or bit rate is available. The necessary bandwidth or bit rate in a given situation can vary depending on the type of audio signal transmitted (audio signal from a telephone, audio signal from a music player (mono, stereo), etc., cf. FIG. 9c) or dynamically depending on the audio codec used (cf. FIG. 9d). The bandwidth needed for the audio signal (payload) thus leaves a varying bandwidth or bit rate for other accompanying signals, including control signals. FIG. 8a shows a normal situation during streaming of audio from the audio gateway 1 to the hearing instruments 2, where both links 3 are intact. Audio is simultaneously received by the two hearing instruments 2 and control signals ensuring an appropriate setting of operational parameters of both hearing instruments are likewise received. FIG. 8b shows a situation, where the wireless link 3' to the rightmost hearing instrument is broken or has a significant reduction in transmission quality (as indicated by the dashed arrow and the ')')' sign intersecting the arrow). Such situation can e.g. occur, if the distance between the master and slave devices is significantly changed (e.g. by movement of the master device to another location on the body, e.g. to one side or even farther away). When one of the uni-directional links is in error, and the link 5 between the hearing instruments is disabled, the audio data signal and the embedded control signal bits are lost for a shorter or longer period of time. Hence, the possibility of synchronizing the instruments is lost, which may result in the two hearing instruments 'ending up' in different, unintended states (e.g. having different volume settings). In this situation, there is a need for an algorithm for detecting and acting on the link-breakdown AND an algorithm for re-establishing the intended state of the hearing instrument pair, when the link is re-established. The urgency of reaction on link-transmission errors, a link-fall out or break-down depends on the allowable amount of audio data that can be lost with an acceptable degradation of audio quality AND the consequences of the loss of control signal bits. The requirements to the speed of re-establishing the intended state of the hearing instrument pair after a link failure is decisive for the form of and strategy for embedding control signals in the audio signal payload.

The quality of the audio signal received by the slave device (here the hearing instruments 2) is e.g. continuously monitored in an Audio Monitor of the slave device. The receiver may further be adapted to monitor the present bandwidth of the received audio signal in relation to the available bandwidth. Depending on the quality specifications, loss of a predefined number $NPA_{loss}$ of audio packets before reaction is acceptable (e.g. a predefined number $NPA_{loss,con}$ of consecutive packets and/or a predefined number $NPA_{loss,rate}$ of packets per unit time). When this number of lost audio packets is exceeded, a decision and/or an action is taken. One decision/reaction can be to close down the audio link in the receiving hearing instrument in question to avoid a bad signal to reach the user.

The control signal (cf. CTRL bits of FIG. 9) is extracted in a slave device from the received payload signal and fed to a processor, which e.g. comprises a timer for checking that CTRL bits appear according to the predetermined scheme, e.g. regularly. If a predefined deviation from this scheme is detected (e.g. one or more groups of control bits being absent in a particular time window), a decision and/or an action is taken, e.g. to reset at least some of the operational parameters (e.g. volume) to a default setting, e.g. to a no-link-setting or to close down the link.

Preferably the reactions of the slave device to lost audio packets and lost CTRL-bits are coordinated in a predefined manner. In an embodiment, the decision to reset an operational parameter related to the reception of audio (e.g. volume) to a default value is taken before the action of closing down the audio link is implemented.

When the link has been re-established (e.g. after link break-down or quality degradation) a fast reestablishment of services for the user (here reception of audio under operational conditions as close to those prior to link-failure as possible) is aimed at. In a preferred embodiment, the control signals representing an intended current setting of an operational parameter (e.g. in particular such parameters that can be gradually changed, e.g. volume) are transmitted from the master device to the slave device as absolute values. Thereby the previous or currently intended setting of the operational parameter(s) can be introduced as fast as possible. Further, the 'synchronization' with the other slave device (receiving the same signal) is automatically ensured (assuming a valid link is available to the other slave device).

Predefined Schemes for Embedding a Control Signal in a Payload Signal:

FIG. 9 shows various allocation schemes of bandwidth for control signals embedded in audio data. Each graph illustrates an allocation in a transmitter of a master device of a fixed total number of payload bits between audio data bits (Audio) and control signal bits (CTRL) as a function of time (or audio frame number ($F_n$) or packet number).

Figure 9A:
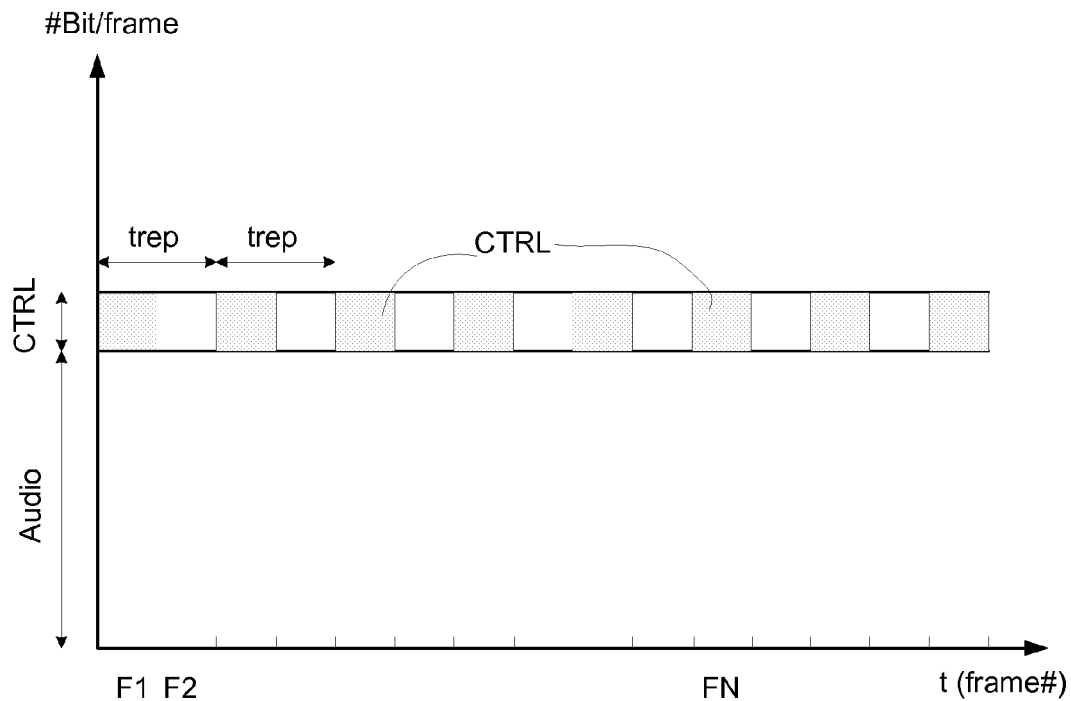
FIG. 9 shows various allocation schemes of bandwidth for control signals embedded in audio data, FIG. 9a being an example of a fixed control signal/audio data bandwidth allocation, FIGS. 9b, 9c and 9d being examples of variable control signal/audio data bandwidth allocations.

FIG. 9a shows an example of a fixed control signal/audio data bandwidth allocation, where an audio frame and a control data field each have a fixed length (comprising e.g. a total of 256 bytes, e.g. 250 audio bytes and 6 control signal bytes). A packet comprises e.g. a header field, an audio codec frame and a control data field (cf. e.g. the top part of FIG. 9d) and typically a check-field (e.g. CRC). The fixed payload bandwidth is in the present context governed by the total number of bits per time unit or packet allocated to audio and control signal bits. In the example, the control data field only contains control signal bits (CTRL) in some of the packets (here in every second packet). In the example of FIG. 9a, control signal bits appear regularly with a predetermined repetition frequency $f_{rep}=1/t_{rep}$, where $t_{rep}$ is the time between the appearance of CTRL-bits, here $2 \cdot T_p$, where $T_p$ is the length of a packet.

Figure 9B:
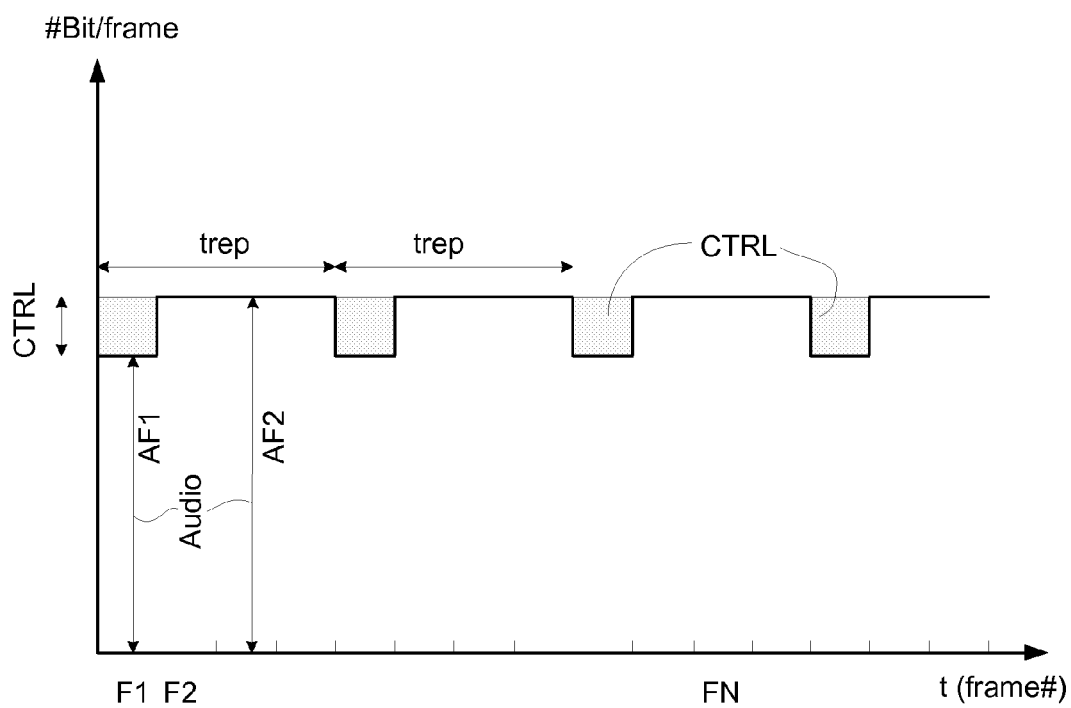
Figure 9C:
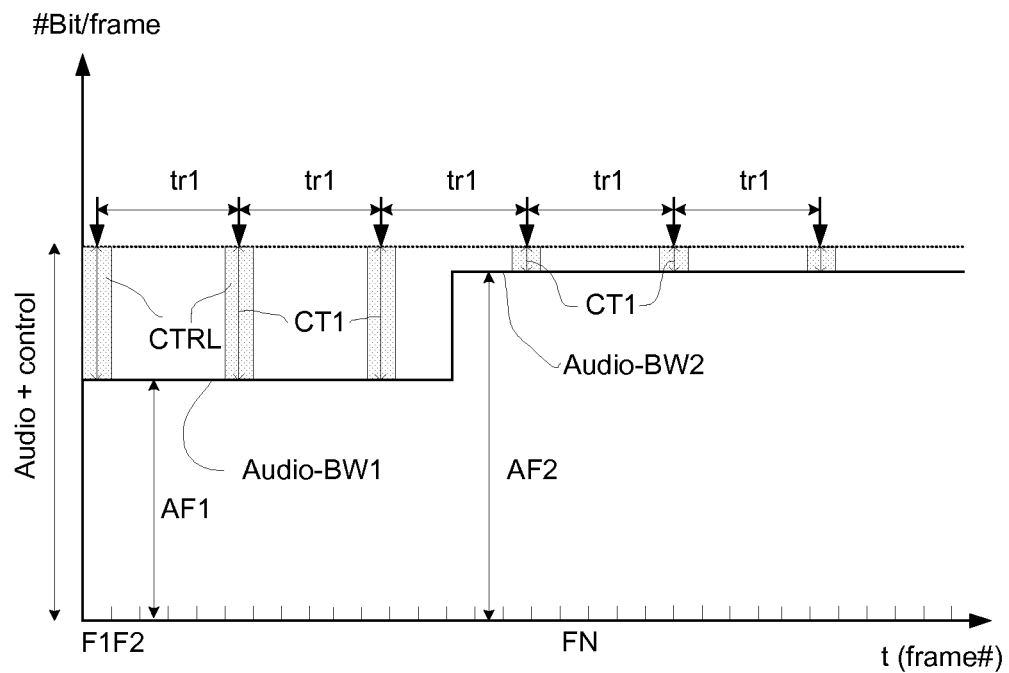
Figure 9D:
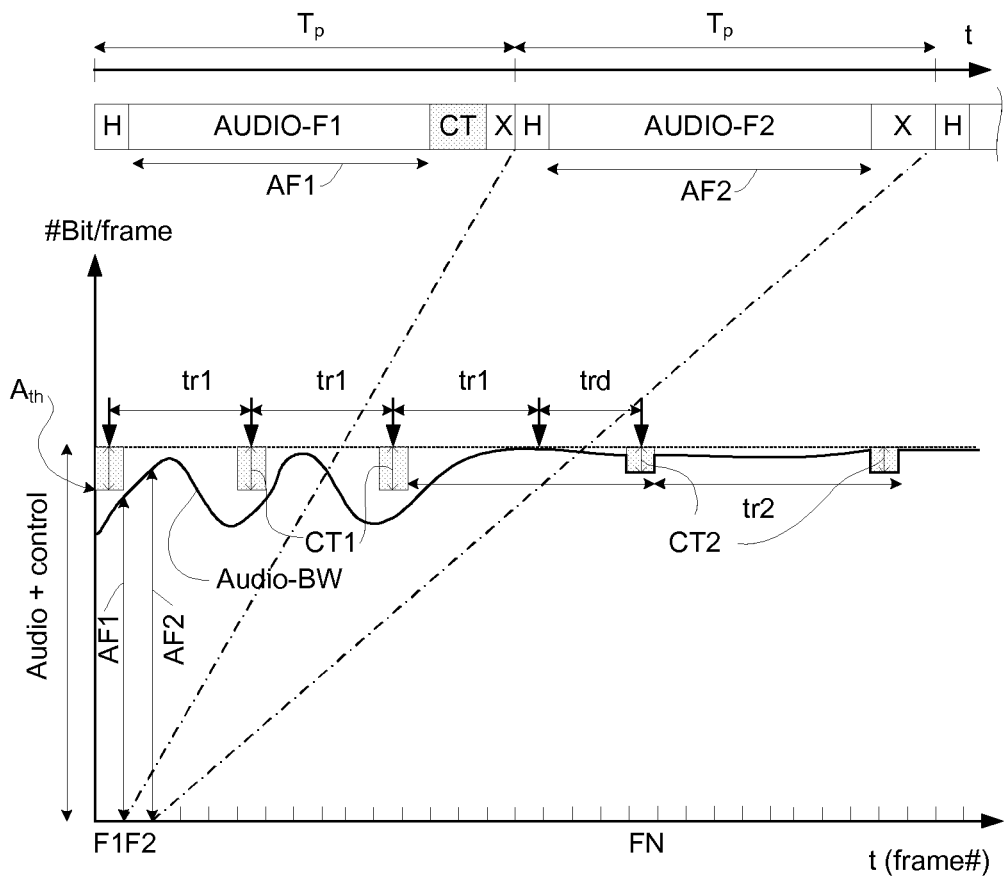

FIGS. 9b, 9c and 9d are examples of variable control signal/audio data bandwidth allocations.

FIG. 9b shows an allocation scheme where two audio frame lengths AF1 and AF2 are accepted or allowed by the used audio codec. In this arrangement, the relative shorter audio frame AF1 is used when the CTRL bits are to be transmitted and the relatively longer audio frame AF2 is used when no CTRL bits are transmitted. In the present embodiment, AF2=AF1+CTRL, where CTRL indicates the number of or duration of control signal bits transmitted in a given packet. This has the advantage over the scheme of FIG. 9a that the available bandwidth is better utilized. In the example of FIG. 9b, control signal bits CTRL appear regularly with a predetermined repetition frequency $f_{rep}=1/t_{rep}$, where $t_{rep}$ is the time between the appearance of CTRL-bits, here $4 \cdot T_p$, where $T_p$ is the length of a packet.

FIG. 9c shows another allocation scheme, where two fixed audio frame sizes AF1 and AF2 are accepted or allowed by the used audio codec. The two frame sizes correspond to two different types of audio signals requiring different bandwidths Audio-BW1 and Audio-BW2 (e.g. corresponding, respectively, to low and high quality audio). In the example of FIG. 9c, control signal bits CTRL appear regularly with a predetermined repetition frequency $f_{rep}=1/t_{r1}$, where $t_{r1}$ is the time between the appearance of CTRL-bits, here $5 \cdot T_p$, where $T_p$ is the length of a packet. In the illustrated scheme, the time between the appearance of CTRL bits in the payload is kept constant at $t_{r1}$ irrespective of the audio bandwidth (or audio frame length), thus leaving fewer CTRL bits (CT2) per occurrence (here per packet) during high audio bandwidth use (Audio-BW2) than (CT1) during low audio bandwidth use (Audio-BW1). This has the consequence that a given number of CTRL bits (larger than the available number of bits per packet during high audio bandwidth use) takes a longer time to be transmitted. This may be acceptable, if no significant changes to the link quality and/or control signals occur. Alternatively, the time $t_{r1}$ between the appearances of CTRL-bits can be reduced, possible proportionally to the reduction in the number of CTRL bits per packet. If e.g. the available number of CTRL-bits CT1 during low audio bandwidth usage is reduced by a certain factor (e.g. a factor 3) during high audio bandwidth usage, the frequency of occurrence of the fewer CTRL bits CT2 during high audio bandwidth usage could be increased by the same factor (e.g. by a factor of 3). Thereby a constant average throughput of CTRL bits is achieved.

FIG. 9d shows an allocation scheme where bandwidth (or number of bits per audio frame) is dynamically allocated within the available limit (here corresponding to the total number of bits per packet available for audio and control signal data, as indicated by the dotted horizontal line and the double arrow denoted Audio+control along the vertical axis #Bit/frame). Such dynamic allocation is common in a number of currently used audio codecs, e.g. MP3. The requested number of audio bits versus time (t) or frame number (frame#, F1, F2, ...., FN, ...) is schematically illustrated by the solid curve denoted Audio-BW. In the example shown, CTRL bits are inserted according to a predefined scheme with a predetermined normal repetition frequency $f_{rep1}=1/t_{r1}$, where $t_{r1}$ is the normal time between the appearance of CTRL-bits (here every $5^{th}$ packet), and the number of CTRL bits is CT1, when the requested number of audio bits is below a threshold value $AF_{th}$, e.g. equal to the available total number of bits Audio+control per packet minus CT1. In case the requested number of audio bits is above the threshold value $AF_{th}$, the number of CTRL bits per packet is reduced to CT2. In case, as shown in FIG. 9d, the requested number of audio bits does not allow space for even the reduced number of CTRL bits CT2 at the normal time of occurrence of the CTRL bits (t~$3 \cdot t_{r1}$ in FIG. 9d), insertion is delayed (up to a predefined maximum $t_{rd}$) to check whether sufficient CTRL-bits (CT1 or CT2) are available in one of the next coming packets ($\leq t_{rd}/T_p$ packets, here 3). If this is NOT the case, as shown in FIG. 9d, CT2 CTRL bits are forcibly inserted, and the time between the appearance of CTRL-bits possibly increased (here shown to $t_{r2}$ comprising 9 packets ($9 \cdot T_p$)), until the requested bandwidth again allows the normal number of CTRL bits CT1 to be inserted and the normal repetition frequency is $1/t_{r1}$ is reestablished.

The top part of FIG. 9d shows the extension in time of the first two packets containing audio frames F1 and F2 (as indicated by the dash-dotted lines to the time/frame#-axis in the lower part of FIG. 9d). Each packet has an extension in time of $T_p$ and comprises a header (H) preceding the audio frames (AUDIO-F1, AUDIO-F2). Audio frame F1 is, as appears from the Audio-BW graph, shorter than F2 (indicated by lengths in time AF1 and AF2, respectively, in the top part of FIG. 9d). Audio frame F1 contains a number of control signal bits (CT), whereas this is not the case in F2. Hence the effective length of the audio frame and control signal bits is or can be different from packet to packet, as indicated by fields X 'filling up' (e.g. with dummy bits or other non-timing-critical information) the right part of the two packets shown, so that the packets have equal lengths in time.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

WO 2007/046748 (CRAJ DEVELOPMENT) 26 Apr. 2007
WO 2007/052189 (PHILIPS) 10 May 2007
US 2005/0255843 A1 (Hilpisch et al.) 17 Nov. 2005
U.S. Pat. No. 6,424,820 B1 (INTERVAL RESEARCH) 23 Jul. 2002
EP 1 460 769 A1 (PHONAK) 22 Sep. 2004
U.S. Pat. No. 6,816,600 (PHONAK) 9 Nov. 2004
EP 1 480 492 A2 (SIEMENS AUDIOLOGISCHE TECHNIK) 24 Nov. 2004

The invention claimed is:

1. A system, comprising:
a master device; and
at least one slave device,
the master device comprising a transmitter,
the at least one slave device comprising a receiver,
wherein the master and slave devices are adapted to establish a uni-directional wireless link for forwarding an upstream signal from the master to the slave device when the master and slave devices are located within a certain distance from each other,
wherein the master device is adapted to provide that the upstream signal comprises a payload signal comprising packets of data representing an audio signal and at least one control signal,
the at least one control signal is/are embedded in the payload signal and repeated according to a predefined scheme, and
wherein the at least one control signal represents an intended current setting of an operational parameter of the slave device, configured to provide that the frequency of occurrence of control bits is dynamically determined according to available bandwidth, the available bandwidth being a residual bandwidth remaining from a current link bandwidth, determined by a transmission rate, and a bandwidth occupied by the payload signal,
wherein master device is provided with a security key and at least one slave device that is/are intended to receive a transmitted signal from the master device is provided with a corresponding predefined key, and wherein the security key received in the at least one slave device is compared to the predefined key of the device in question,
wherein the at least one control signal is/are assembled in a status packet of the transmitted signal and the reception of the status packet initiates an update of the setting of the operational parameter(s) of the slave device with the value(s) contained in the received status packet,
wherein the length and/or frequency of occurrence in the payload signal of a status packet is optimized with regard to minimizing latency.

2. A system according to claim 1, wherein the master and slave devices are adapted to provide that the control signal representing an intended current setting of an operational parameter is transmitted as parameter representative of an absolute value.

3. A system according to claim 1 or 2, wherein the slave device is a battery driven device.

4. A system according to claim 1, wherein the master device comprises a remote control of the slave device and/or an audio selection device for selecting an audio signal among a multitude of audio signals and forwarding the selected signal to the slave device.

5. A system according to claim 1 adapted to provide that the linking procedure between master and slave is based on the identification of a predefined security key in the slave device.

6. A system according to claim 1 adapted to provide that the at least one control signal is periodically repeated in the payload signal at least every 1 s.

7. A system according to claim 1 adapted to provide that the at least one control signal comprises control signals for the setting of one or more parameters of the slave device selected from the group of parameters comprising receiver volume, program selection, sound effects, type of audio signal transmitted.

8. A system according to claim 1 adapted to provide that the at least one control signal is/are assembled in a status packet of the transmitted signal and that the reception of the status packet initiates an update of the setting of the operational parameter(s) of the slave device with the value(s) contained in the received status packet.

9. A system according to claim 8 adapted to provide that the frequency of occurrence of the status packet is determined, such as dynamically determined, according to the available bandwidth.

10. A system according to claim 1 wherein the slave device is adapted to detect errors in the uni-directional link by monitoring the payload signal and/or the embedded control signal.

11. A system according to claim 10 wherein the slave device comprises an algorithm for taking a decision and/or initiating an action when a predefined number of consecutive payload packets and/or a predefined total number of payload packets per unit time have been lost or are erroneous.

12. A system according to claim 11 adapted to provide that the algorithm for embedding and/or repeating the control signal (or control signal data) in the payload signal (or payload data) in the upstream signal of the uni-directional link from the master to the slave device AND the algorithm(s) for taking a decision and/or initiating an action in the slave device in case errors are detected in the uni-directional link are adapted to each other.

13. A system according to claim 1 wherein the slave device is adapted to monitor whether the control signal occur in the received signal in accordance with the predefined scheme.

14. A system according to claim 13 wherein the slave device comprises an algorithm for taking a decision and/or initiating an action if a predefined deviation from this scheme is detected.

15. A system according to claim 14 wherein the algorithms of the slave device for taking a decision and/or initiating an action in case errors are detected in the uni-directional link are adapted to each other.

16. The system according to claim 1, wherein the master device forms part of an audio selection device, adapted for establishing a wireless link to a hearing instrument.

17. A system according to claim 1, wherein the available bandwidth is the residual bandwidth considering the current link bandwidth, determined by the transmission rate, and the bandwidth occupied by the payload data signal.

18. A method of establishing a uni-directional wireless link for forwarding an upstream signal from a master to a slave device, the method comprising:
  a) providing a master device comprising a transmitter;
  b) providing a slave device comprising a receiver;
  c) providing that the master and slave devices are located within a certain distance from each other to provide an appropriate wireless communication from transmitter to receiver;
  d) providing that the upstream signal comprises a payload signal comprising packets of data representing an audio signal and at least one control signal;
  e) providing that at least one control signal is/are embedded in the payload signal and repeated according to a predefined scheme;
  f) providing that the at least one control signal represents an intended current setting of an operational parameter of the slave device, configured to provide that the frequency of occurrence of control bits is dynamically determined according to an available bandwidth, the available bandwidth being a residual bandwidth remaining from a current link bandwidth, determined by a transmission rate, and a bandwidth occupied by the payload signal;
  providing the master device with a security key and providing the at least one slave device that is/are intended to receive a transmitted signal from the master device with a corresponding predefined key, and wherein the security key received in the at least one slave device is compared to the predefined key of the device in question;
  providing that the at least one control signal is/are assembled in a status packet of the transmitted signal and that the reception of the status packet initiates an update of the setting of the operational parameter(s) of the slave device with the value(s) contained in the received status packet, wherein
  the length and/or frequency of occurrence in the payload signal of a status packet is optimized with regard to minimizing latency.

19. A method according to claim 18 providing that the frequency of occurrence of the status packet is determined according to the available bandwidth.

20. A method according to claim 19 providing that the frequency of occurrence of status packets is relatively higher during relatively low bandwidth utilization of the payload signal, while the frequency of occurrence of status packets is relatively lower during relatively high bandwidth utilization of the payload signal.

21. A method according to claim 18 wherein the payload signal represents a continuous, realtime audio signal.

22. A method according to claim 18 wherein the control signal representing an intended current setting of an operational parameter of the slave device is transmitted as a parameter representative of an absolute value.

23. A tangible non-transitory computer-readable medium storing a computer program comprising program code instructions for causing a data processing system to perform the steps of the method of claim 18, when said computer program is executed on the data processing system.

24. A data processing system comprising a processor and program code instructions for causing the processor to perform the steps of the method of claim 18.

25. A system, comprising:
  a master device; and
  at least one slave device,
  the master device comprising a transmitter,
  the at least one slave device comprising a receiver,
  wherein the master and slave devices are adapted to establish a uni-directional wireless link for forwarding an upstream signal from the master to the slave device when the master and slave devices are located within a certain distance from each other,
  wherein the master device is adapted to provide that the upstream signal comprises a payload signal comprising packets of data representing an audio signal and at least one control signal,
  the at least one control signal is/are embedded in the payload signal and repeated according to a predefined scheme, and
  wherein the at least one control signal represents an intended current setting of an operational parameter of the slave device, configured to provide that the frequency of occurrence of control bits is dynamically determined according to available bandwidth, the available bandwidth being a residual bandwidth remaining from a current link bandwidth, determined by a transmission rate, and a bandwidth occupied by the payload signal,
  wherein the system is configured to implement a dynamic scheme of allocating bandwidth for control signals embedded in audio data, the dynamic scheme comprising
    when the requested number of audio bits is below a threshold value $AF_{th}$, the normal number of control bits is CT1, and control bits are inserted according to a predefined scheme with a predetermined normal repetition frequency $f_{rep1}=1/t_{r1}$, where $t_{r1}$ is the normal time between the appearance of control bits, and
    when the requested number of audio bits is above a threshold value $AF_{th}$, the number of control bits per packet is reduced to CT2,
  wherein the system is configured to implement that in case the requested number of audio bits does not allow space for the reduced number of control bits CT2 at the normal time of occurrence of the control bits,
  insertion of control bits is delayed up to a predefined maximum $t_{rd}$ to check whether sufficient space for control bits is available in one of the next coming packets, and
  if this is not the case, the reduced number of control bits CT2 are forcibly inserted, and the time between the appearance of control bits increased until the requested bandwidth again allows the normal number of control bits CT1 to be inserted and the normal repetition frequency $1/t_{r1}$ to be re-established.

26. A method of establishing a uni-directional wireless link for forwarding an upstream signal from a master to a slave device, the method comprising:
  providing a master device comprising a transmitter;
  providing a slave device comprising a receiver;
  providing that the master and slave devices are located within a certain distance from each other to provide an appropriate wireless communication from transmitter to receiver;
  providing that the upstream signal comprises a payload signal comprising packets of data representing an audio signal and at least one control signal;
  providing that at least one control signal is/are embedded in the payload signal and repeated according to a predefined scheme;
  providing that the at least one control signal represents an intended current setting of an operational parameter of the slave device, configured to provide that the frequency of occurrence of control bits is dynamically determined according to an available bandwidth, the available bandwidth being a residual bandwidth remaining from a current link bandwidth, determined by a transmission rate, and a bandwidth occupied by the payload signal;

implementing a dynamic scheme of allocating bandwidth for control signals embedded in audio data, the dynamic scheme including when a requested number of audio bits is below a threshold value $AF_{th}$, a normal number of control bits is CT1, and the control bits are inserted according to a predefined scheme with a predetermined normal repetition frequency $f_{rep1}=1/t_{r1}$, where $t_{r1}$ is the normal time between the appearance of control bits, and when the requested number of audio bits is above a threshold value $AF_{th}$, the number of control bits per packet is reduced to CT2, wherein in case the requested number of audio bits does not allow space for the reduced number of control bits CT2 at the normal time of occurrence of the control bits, insertion of the control bits is delayed up to a predefined maximum $t_{rd}$ to check whether sufficient space for control bits is available in one of the next coming packets, and in case the requested number of audio bits does allow space for the reduced number of control bits CT2 at the normal time of occurrence of the control bits, the reduced number of control bits CT2 are forcibly inserted, and the time between the appearance of control bits increased until the requested bandwidth again allows the normal number of control bits CT1 to be inserted and the normal repetition frequency $1/t_{r1}$ to be re-established.

\* \* \* \* \*